May 19, 1936.  I. M. UPPERCU  2,041,623
AIRCRAFT
Filed March 29, 1934
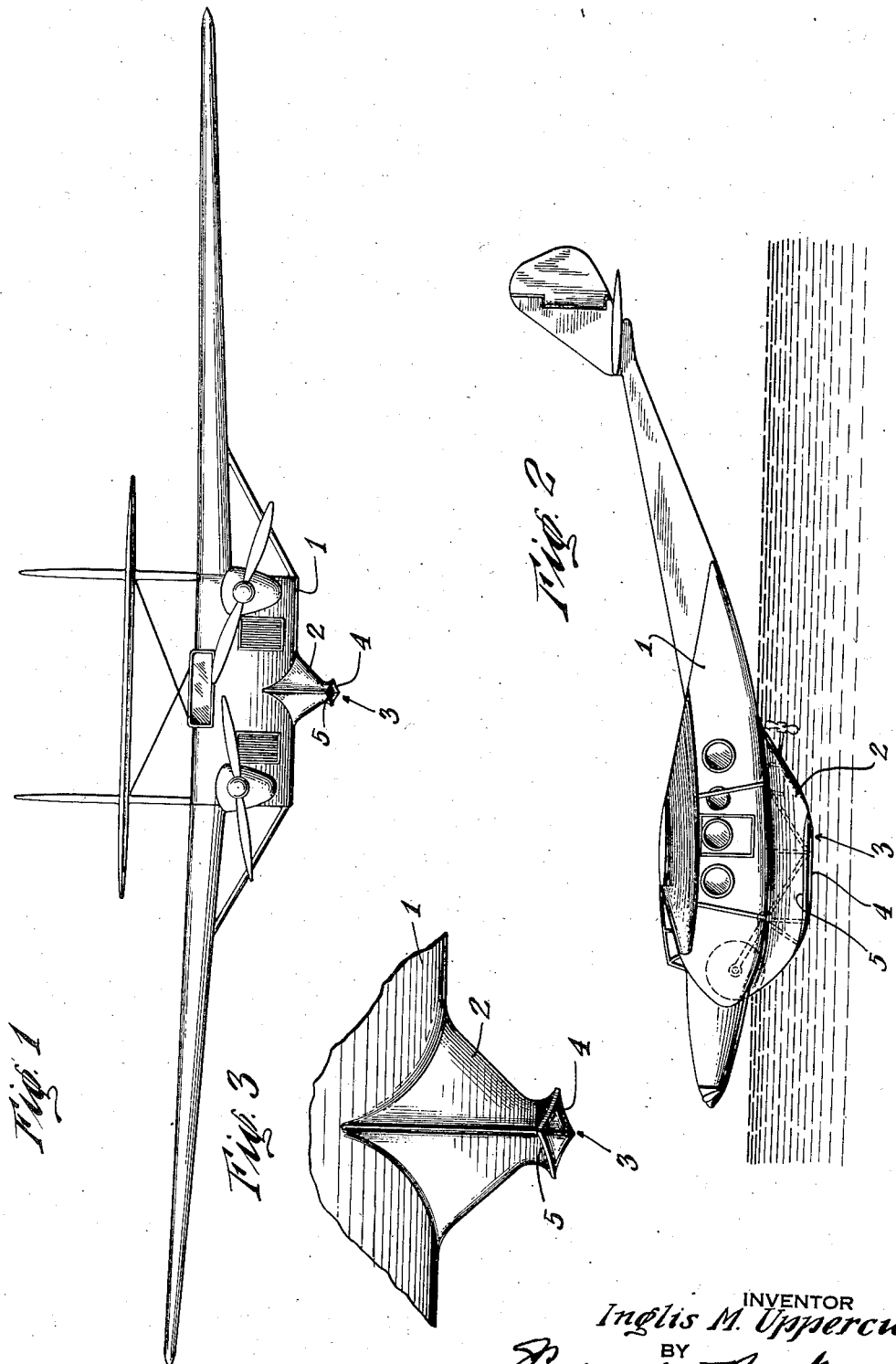
INVENTOR
Inglis M. Uppercu
BY
Frederick Barker
ATTORNEY Patented May 19, 1936

2,041,623

UNITED STATES PATENT OFFICE 2,041,623

AIRCRAFT

Inglis M. Uppercu, Rumson, N. J., assignor, by mesne assignments, to Burnelli Aircraft, Ltd., Keyport, N. J., a corporation of Delaware Application March 29, 1934, Serial No. 718,065

3 Claims. (Cl. 244—2)

This invention relates to land type airplanes and my improvement is directed to the provision of means for facilitating the emergency alighting of such craft on water.

In the example of my invention presented in this application I provide the fuselage of a high-wing monoplane with what may be termed an emergent keel that is held pendent from the fuselage bottom by a suitable supporting web structure, said keel having upwardly diverging side walls adapted to splay water therefrom in entering the body of water, thereby easing the force of impact with which the fuselage bottom will strike the surface.

Further the keel, which may be approximately rhombic in cross-section, is adapted to obtain a purchase hold in the water whereby it tends to prevent rolling, and the resulting lateral stabilization of the craft in water is enhanced by the resistance set up in the web structure which connects the keel with the fuselage bottom. Particularly the "flat" bottomed character of the Burnelli type fuselage or central wing section, with its relatively wide span and airfoil contour provides a large measure of lateral stability in water, the craft behaving more in the nature of a raft.

It is well appreciated that an airplane having wheels is able to take-off, from land, more easily than a seaplane can take-off from water; also that flotation equipment in flight offers head resistance that is absent in the land flying machine equipped with retractible landing gear.

Therefore my invention present safety means for a land machine flying over water, because, the wheels being retracted and the fuselage made water-tight, an emergency landing on water can be effected without the liability of damaging the craft, and then the craft will float like a raft.

The wings may be detachably mounted, also the tail group, so that if the weather be stormy these elements can be detached by any known method.

Also the web structure which connects the keel to the fuselage may contain a motor for the operation of a screw propeller, to render the craft dirigible in surface operation.

Other features and advantages of my invention will hereinafter appear.

In the drawing:—

Figure 1 is a front elevation of a high-wing monoplane, with landing wheels that are retracted, and showing my improved crash keel.

Fig. 2 is a side elevation thereof, the airplane having alighted on water, and

Fig. 3 is a partial view on an enlarged scale of the crash keel.

The particular airplane illustrated herein is of the Burnelli type, having a wide fuselage 1 of airfoil contour, from whose bottom surface there depends a V-shaped structure 2 that lies in the longitudinal centre of the fuselage, this structure 2 forming a connecting web between the fuselage bottom and a keel 3. This keel 3 has the lower diverging walls 4 and upper converging walls 5, so that the keel approximately resembles a rhomb in cross-section.

Between the walls of the structure 2 may be a container for fuel (not shown).

Of course the fuselage is to be of water-tight construction to be capable of flotation.

As will be obvious to those skilled in the art the structure 2 may have a stream-lined contour to minimize its drag effect in flight.

Variations within the spirit and scope of my invention are equally comprehended by the foregoing disclosure.

I claim:

1. An airplane having a wide fuselage with a relatively flat bottom, said fuselage being capable of floating in water, a relatively narrow web structure extending downwardly from said fuselage and an emergency crash keel carried at the lower edge of the web structure, said keel member being wider than the adjacent portion of the web structure.

2. An airplane having a wide fuselage with a relatively flat bottom, said fuselage being capable of floating in water, a relatively narrow web structure extending downwardly from said fuselage and an emergency crash keel carried at the lower edge of the web structure, the side walls of the web structure flaring upwardly and outwardly, the side walls of the keel member also flaring upwardly and outwardly and being more divergent than the side walls of the web structure.

3. An airplane having a wide fuselage with a relatively flat bottom, said fuselage being capable of floating in water, a relatively narrow web structure extending downwardly from said fuselage and an emergency crash keel carried at the lower edge of the web structure, the side walls of the keel member being divergent upwardly with respect to the side walls of the web structure.

INGLIS M. UPPERCU.